United States Patent
Sarkisian et al.

(10) Patent No.: US 6,726,757 B2
(45) Date of Patent: Apr. 27, 2004

(54) INK ADDITIVES TO IMPROVE DECEL

(75) Inventors: George M. Sarkisian, San Diego, CA (US); Shunqiong Yue, San Diego, CA (US); David Jenkins, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 196 days.

(21) Appl. No.: 10/035,656

(22) Filed: Oct. 19, 2001

(65) Prior Publication Data

US 2003/0084817 A1 May 8, 2003

(51) Int. Cl.$^7$ ............................................. C09D 11/02
(52) U.S. Cl. ................... 106/31.58; 106/31.86; 106/31.59; 106/31.89; 106/31.87
(58) Field of Search ............... 106/31.58, 31.86, 106/31.59, 31.89, 31.87

(56) References Cited

U.S. PATENT DOCUMENTS

| | | | |
|---|---|---|---|
| 5,085,698 A | 2/1992 | Ma et al. | |
| 5,108,503 A | 4/1992 | Hindagolla et al. | |
| 5,169,436 A | 12/1992 | Matrick | |
| 5,180,425 A | 1/1993 | Matrick et al. | |
| 5,416,145 A | 5/1995 | Askeland et al. | |
| 5,431,720 A * | 7/1995 | Nagai et al. | 106/31.43 |
| 5,501,725 A | 3/1996 | Lauw et al. | |
| 5,536,306 A | 7/1996 | Johnson et al. | |
| 5,565,022 A | 10/1996 | Wickramanayake | |
| 5,596,027 A * | 1/1997 | Mead et al. | 523/161 |
| 5,601,639 A * | 2/1997 | Myers et al. | 106/31.58 |
| 5,606,356 A * | 2/1997 | Noguchi et al. | 347/100 |
| 5,624,485 A | 4/1997 | Calhoun | |
| 5,626,655 A | 5/1997 | Pawlowski et al. | |
| 5,730,789 A | 3/1998 | Botros | |
| 5,730,790 A | 3/1998 | Rehman | |
| 5,801,738 A | 9/1998 | Stoffel et al. | |
| 5,883,157 A | 3/1999 | Yamashita | |
| 5,925,176 A | 7/1999 | Rehman | |
| 5,977,209 A | 11/1999 | Breton | |
| 6,030,441 A * | 2/2000 | Kubota et al. | 106/31.75 |
| 6,048,389 A | 4/2000 | Price et al. | |
| 6,059,868 A | 5/2000 | Kasperchik | |
| 6,075,131 A * | 6/2000 | Tallant et al. | 534/659 |
| 6,080,229 A * | 6/2000 | Watanabe et al. | 106/31.43 |
| 6,183,549 B1 | 2/2001 | Wight | |
| 6,419,733 B1 * | 7/2002 | Sano et al. | 106/31.86 |
| 6,485,139 B1 * | 11/2002 | Lavery et al. | 347/101 |

FOREIGN PATENT DOCUMENTS

| | | |
|---|---|---|
| EP | 0 997 505 | 5/2000 |

OTHER PUBLICATIONS

McCutheon's, Detergents and Emulsifiers, Allured Publishing Corp., 1972, pp. 43 and 171.*

* cited by examiner

*Primary Examiner*—C. Melissa Koslow
*Assistant Examiner*—Veronica F. Faison

(57) ABSTRACT

Ink additives that reduce the deceleration of inks containing a polymer, such as acrylate binders, are disclosed. In accordance with the invention, an ink-jet liquid, an ink-jet liquid set, and the method for using the same are provided, wherein the one of the liquids comprises an aqueous vehicle, and a deceleration-alleviating component. The present formulations are used to formulate ink-jet liquids, and more particularly, to provide enhanced drop ejection performance in inks containing a polymer, such as deceleration (rapid drop velocity degradation during continuous operation of the firing resistor), when the liquid contains a deceleration-alleviating agent, such as, an aromatic glycol ether, a polar solvent and a long alkyl chain surfactant.

4 Claims, No Drawings

INK ADDITIVES TO IMPROVE DECEL

FIELD OF THE INVENTION

The present invention relates to ink additives for improving deceleration in ink jet inks containing polymers. More particularly, the present invention relates to ink additives that reduce the deceleration.

BACKGROUND OF THE INVENTION

Ink-jet printing is a non-impact printing process in which droplets of ink are deposited on print media, such as paper, transparency film, or textiles. Essentially, ink-jet printing involves the ejection of fine droplets of ink onto print media in response to electrical signals generated by a microprocessor.

In general, a successful ink set for color ink-jet printing should have the following properties: good crusting resistance, good stability, proper viscosity, proper surface tension, good color-to-color bleed alleviation, rapid dry time, no negative reaction with the vehicle, consumer-safety, good permanence (e.g., smearfastness, lightfastness, waterfastness), and low strike-through. When placed into a thermal ink-jet system, the ink set should also be kogation-resistant and have stable drop ejection performance (e.g. little or no drop velocity degradation over time).

There are two basic means currently available for achieving ink droplet ejection in ink-jet printing: thermally and piezoelectrically. In thermal ink-jet printing, the energy for drop ejection is generated by electrically-heated resistor elements, which heat up rapidly in response to electrical signals from a microprocessor to create a vapor bubble, resulting in the expulsion of ink through nozzles associated with the resistor elements. In piezoelectric ink-jet printing, the ink droplets are ejected due to the vibrations of piezoelectric crystals, again, in response to electrical signals generated by the microprocessor. The ejection of ink droplets in a particular order forms alphanumeric characters, area fills, and other patterns on the print medium.

One major drawback of pigmented inks in thermal inkjet printers is the formation of a pigmented film on the resistor surface during prolonged printing. The formation of this film results in a steady and continuous loss of heat transmission to the ink resulting in a phenomena called "deceleration", or decel, which, in thermal ink-jet technology, refers to a decrease of drop velocity during continuous firing of a nozzle or nozzles. This can lead to drop misdirection, misplacement, or even nozzle turn-off (where velocity equals 0). It is understood that the presence of organic acids serve to prevent the formation of transient insoluble material that can affect heat transfer from the firing resistor to the ink, thereby causing inefficient drive bubble formation, which in turn causes decel.

Decel is often caused by low solubility of the polymer, which is added to improve durability of the ink. One common way to solve decel is to use a inks containing hydrophilic polymers, such as the aqueous inks containing polymers (e.g., acrylate binders) disclosed in U.S. Pat. No. 5,180,425, the entire contents of which are hereby incorporated by reference. Doing so, however, typically leads to a reduction in the waterfastness of the ink.

As previously discussed, ink compositions are required to have certain characteristics. However, few ink compositions are known that possess all the aforementioned properties, since an improvement in one property often results in the degradation of another property.

SUMMARY OF THE INVENTION

In accordance with the invention, an ink-jet liquid, an ink-jet liquid set, and the method for using the same are provided, wherein the one of the liquids comprises an aqueous vehicle, and a component capable of alleviating decel in inks containing polymer(s) (acrylate binders), the decel-alleviating component being capable of undergoing rapid thermal decomposition upon heating.

The present formulations are used to formulate ink-jet liquids for use with inks having polymer(s), and more particularly, to provide enhanced drop ejection performance in such ink compositions, such as decel, when the liquid contains a decel-alleviating agent, such as, an aromatic glycol ether, a polar solvent and a long alkyl chain surfactant.

DETAILED DESCRIPTION OF THE INVENTION

In accordance with the present invention, the ink additives to reduce decel in ink formulations containing a polymer fall into three categories. These categories include aromatic glycol ethers, polar solvents and surfactants, particularly long alkyl chain surfactants.

Glycol Ethers

Glycol ethers are generally water soluble or water miscible organic solvents. Specific examples of aromatic glycol ethers include propylene glycol phenyl ether and ethylene glycol phenyl ether. In a particular embodiment of the present invention, Dowanol PPh and Dowanol EPh glycol ethers are used. Dowanol PPh glycol ether is a slow-evaporating, very hydrophobic glycol ether—more hydrophobic than would be expected based simply on its molecular weight (152.2 g/mol). With its aromatic structure, Dowanol PPh glycol ether is an excellent match for ink solvents in ball point and felt tip pens, stamp pads, and textile printing pastes. Dowanol EPh glycol ether is also an aromatic, slow-evaporating glycol ether. It is often used as a solvent in printing inks. The addition of the glycol ethers to ink compositions containing polymer(s) has been found to have superior decel-alleviating properties as compared to a standard hydrophilic solvent.

Polar Solvents

Polar solvents have also been found to have decel-alleviating properties in ink compositions containing polymer(s). Examples of polar solvents usable in accordance with the present invention are alkyl alcohols, amides, ketones and ketone alcohols, alkylene glycols, glycerins, alkyl ethers and sulfones. One or more of these compounds may be used. Caprolactones and dimethyl sulfoxide were found to have particularly good decel-alleviating properties in the aforementioned ink compositions.

Surfactants

Surfactants are substances which are adsorbed at surfaces or interfaces, thereby reducing the surface or interfacial tension. Soaps and detergents are examples of surfactants in aqueous systems. The action of a surfactant is demonstrated by measuring the contact angle of a drop of pure water on a non-adsorbent surface, the addition of a minute quantity of surfactant decreasing the angle of contact while at the same time increasing the interfacial area. Incorrect use of surfactants can result in decreased adhesion to some substrates and can lower the water resistance of a print. Selection must be made with knowledge of the properties of the surfactants, the formulation objectives and the precise amount needed to attain those objectives efficiently. This approach discourages indiscriminate use which can yield poor performance and be costly.

Surfactants help increase the penetration rate of the ink into the paper, which may also result in the reduction of edge acuity. Moreover, the addition of surfactant-containing inks could cause puddles on the nozzle plates of the printhead, leading to poor drop ejection characteristics.

A suitable surfactant for use in accordance with the present invention modifies the surface energy of the print media so as to increase the ink compositions vertical penetration rate. The surfactant must, however, possess the appropriate hydrophile lipophile balance (HLB balance). A surfactant having a higher HLB balance value tends to be relatively water soluble. However, such surfactants also tend to cause more lateral diffusion of ink along the surface of the print media, thereby causing more undesirable bleed. A surfactant having a lower HLB balance value generally, is less soluble in water and, therefore, causes less lateral diffusion of ink along the surface of the print media. Less soluble surfactants, thus, cause less bleed.

In contrast, the steep drop in surface tension caused by the incorporation of other surfactants into ink-jet inks is known to cause puddles on the nozzle plates of the printhead, thereby negatively affecting drop ejection characteristics. Moreover, these other surfactants increase the penetration rate of the ink into the paper to such a degree that edge acuity may be affected.

In general, surfactants can affect the waterfastness, bleed performance, and optical density of ink-jet images. Waterfastness is of particular concern when surfactants are added to ink compositions containing polymers, such as acrylate binders. Waterfastness is the resistance of an impression to dilution or removal by water. A waterfast ink has a reduced tendency to wick, feather or be washed away. Thus, a continued demand in ink-jet printing has resulted in the need to develop reliable printers capable of producing high quality waterfast images at a reasonable cost. In view of the foregoing, it is understood that surfactants, as well as other solvents, must be incorporated into ink formulations in specific quantities or ranges in order to obtain a desirable set of characteristics or properties.

Suitable surfactants for use with the present invention may be nonionic, anionic or cationic. Examples of suitable nonionic surfactants are polyoxyethylene alkyl ethers, such as polyoxyethylene lauryl ether and polyoxyethylene cetyl ether; polyoxyethylene alkyl phenyl ethers, such as polyoxyethylene nonyl phenyl ether and polyoxyethylene octyl phenyl ether; sorbitan fatty acid esters, such as sorbitan monooleate and sorbitan tristearate; glycerin fatty acid esters, such as glyceryl monostearate and glyceryl monooleate; polyoxyethylene alkylamines, polyoxyethylene alkylamides, polyoxyethylene fatty acid esters, polyglycerin fatty acid esters, propylene glycol fatty acid esters, pentaerythritol fatty acid esters, acetylene glycol, acetylene alcohol and fluorine containing surfactants. Examples of suitable anionic surfactants are alkylsulfate, polyoxyethylene alkyl ether sulfate, polyoxyethylene alkyl ether phosphate, alkylbenzenesulfonate and alkyl sulfosuccinate. Examples of suitable cationic surfactants are quaternary ammonium salts, such as benzalkonium chloride and cetyltrimethyl ammonium chloride. The surfactant used in accordance with the present invention is not limited to these surfactants and may additionally include other surfactants known in the art, such as those described in U.S. Pat. Nos. 5,626,655 and 5,730,790, the contents of which patents are incorporated in their entirety by reference.

The present invention preferably includes non-ionic surfactants, that is surfactants having no residual electrical charge. Examples of suitable non-ionic, long alkyl chain surfactants that reduce decel in inks containing polymers are Oleyl triethoxy mono diphosphate (Crodafos N-3 acid), Poly(oxy-1,2-ethandiyl), alpha-undecyl-omega-hydroxy-, (9CI) (Neodol 1-9) and surfynol SE-F.

Aqueous Vehicle

The ink of the present invention is created and contained in an aqueous vehicle. The aqueous carrier medium is water or a mixture of water and at least one water-soluble organic solvent. Selection of a suitable mixture depends on requirements of the specific application, such as desired surface tension and viscosity, the selected colorant, drying time of the ink, and the type of substrate onto which the ink will be printed. Representative water-soluble organic solvents that may be selected are disclosed in U.S. Pat. No. 5,085,698. Generally, a mixture of water and a polyhydric alcohol, such as diethylene glycol, is preferred as the aqueous carrier medium.

In the case of a mixture of water and at least one water-soluble solvent, the aqueous carrier medium usually includes from about 30% to about 95% water. The preferred compositions contain from about 60% to about 95% water, based on the total weight of the aqueous carrier medium.

Decel-Alleviating Component

The present ink-jet liquids alleviate decel in inks containing polymers by including a "decel-alleviating component."

The decel-alleviating component is preferably present in sufficient amount to allow for the proper cleansing of the firing resistors. Preferably, the decel-alleviating component is present in the liquid from about 0.05 to about 3 wt. % of decel-alleviating component based on the initial weight of the polymer-containing ink, and more preferably from about 0.5 to about 2.5 wt. %.

As previously stated, many of the aforementioned humectants are used in ink compositions. The concentration of these humectants, however, generally ranges from 3% to 10%. It was unexpected that low amounts of humectants would create a decel-alleviating component. These low levels, generally 0.05% to about 3% weight by percent, and more preferably from about 0.5 to about 2.5%, create a decel-alleviating effect and maintain waterfastness properties of these particular inks. Thus, low levels of glycol ethers, polar solvents and surfactants can be used to create decel-alleviating inks of the present invention. Alternatively, the decel-alleviating solvents of the present invention may be combined with one another to create improved inks, so long as the total wt % of the decel-alleviating solvents is maintained between from about 0.05% to about 3%.

The invention will now be further illustrated by, but not limited to, the following examples, in which parts and percentages are by weight unless otherwise noted.

TABLE 1

Ink A

| COMPOUND | PERCENT BY WEIGHT |
|---|---|
| Silwet L-77 | 0.3 |
| Surfynol CT-111 | 0.7 |
| 2-Pyrrolidone | 6 |
| 1,6 Hexanediol | 3 |
| LEG-1 | 1.5 |
| Self-dispersed black pigment | 3 |
| acrylate binder (Joncryl 67) | 3 |
| Proxel GXL PROXEL (ICI America) | 0.2 |
| Water | 82.3 |

Preferably, the Ink A composition contains a concentration by weight of Silwet L-77, 0.01%–0.5%; Surfynol CT-11, 0.01%–1%; 2-Pyrrolidone, 1%–10%; 1,6

Hexanediol, 0.5%–5%; LEG-1 (an ethyloxated glycerol derivative with high molecular weight) 1%–3%; Self-dispersed black pigment, 1%–5%; acrylate binder (Joncryl 67, available from S. C. Johnson) 1%–5%; Proxel GXL, 0.01%–0.2%; and water, which makes up the balance of the composition.

TABLE 2

Ink B

| COMPOUND | PERCENT BY WEIGHT |
| --- | --- |
| Silwet L-77 | 0.3 |
| Surfynol CT-111 | 0.7 |
| 2-Pyrrolidone | 6 |
| 1,6 Hexanediol | 3 |
| LEG-1 | 1.5 |
| Dowanol Eph | 2 |
| Self-dispersed black pigment | 3 |
| acrylate binder (Joncryl 67) | 3 |
| Proxel GXL | 0.2 |
| Water | 80.3 |

Ink B further includes Dowanol EPh. Dowanol EPh is an ethylene glycol phenyl ether that helps reduce the decel of the ink. Dowanol EPh is present in a concentration of from about 0.05 wt. % to about 3 wt. %. The percent by weight ranges of the Silwet L-77, Surfynol CT-111, 2-Pyrrolidone, 1,6 Hexanediol, LEG-1, Self-dispersed black pigment, acrylate binder and Proxel GXL are the same as those described in the section on Ink A.

TABLE 3

Ink C

| COMPOUND | PERCENT BY WEIGHT |
| --- | --- |
| Silwet L-77 | 0.3 |
| Surfynol CT-111 | 0.7 |
| 2-Pyrrolidone | 6 |
| 1,6 Hexanediol | 3 |
| LEG-1 | 1.5 |
| Dowanol PPh | 2 |
| Self-dispersed black pigment | 3 |
| acrylate binder (Joncryl 67) | 3 |
| Proxel GXL | 0.2 |
| Water | 80.3 |

Ink C is identical to Ink B, except that Dowanol EPh is replaced with Dowanol PPh. Dowanol PPh is a propylene glycol phenyl ether. The percent weight range of the Dowanol PPh in Ink C is from 0.05% to 3%. The other components have the same ranges as described in the Ink A.

TABLE 4

Ink D

| COMPOUND | PERCENT BY WEIGHT |
| --- | --- |
| Silwet L-77 | 0.3 |
| Surfynol CT-111 | 0.7 |
| 2-Pyrrolidone | 6 |
| 1,6 Hexanediol | 3 |
| LEG-1 | 1.5 |
| Caprolactone | 2 |
| Self-dispersed black pigment | 3 |
| acrylate binder (Joncryl 67) | 3 |
| Proxel GXL | 0.2 |
| Water | 80.3 |

In Ink D, the glycol ether is replaced with Caprolactone. Caprolactone is present in Ink D at a concentration of from 0.02 wt. % to 3 wt. %. The ranges for the other components in the ink composition remain the same as described above.

TABLE 5

Ink E

| COMPOUND | PERCENT BY WEIGHT |
| --- | --- |
| Silwet L-77 | 0.3 |
| Surfynol CT-111 | 0.7 |
| 2-Pyrrolidone | 6 |
| 1,6 Hexanediol | 3 |
| LEG-1 | 1.5 |
| DMSO | 2 |
| Self-dispersed black pigment | 3 |
| acrylate binder (Joncryl 67) | 3 |
| Proxel GXL | 0.2 |
| Water | 80.3 |

Ink E represents an ink composition that reduces decel by adding dimethyl sulfoxide (DMSO). With the addition of the DMSO and a subsequent reduction in water, the ink composition was found to have a superior decel-alleviating component while still maintaining waterfastness. The percent by weight of the DMSO can range from 0.05 wt. % to 3 wt. %.

Low level surfactants have also been found to reduce decel in an ink jet printer. Ink F and Ink H illustrate ink compositions that contain low-level surfactants.

TABLE 6

Ink F

| COMPOUND | PERCENT BY WEIGHT |
| --- | --- |
| Silwet L-77 | 0.3 |
| Surfynol CT-111 | 0.7 |
| 2-Pyrrolidone | 6 |
| 1,6 Hexanediol | 3 |
| LEG-1 | 1.5 |
| Oleyl triethoxy mono diphosphate | 2 |
| Self-dispersed black pigment | 3 |
| acrylate binder (Joncryl 67) | 3 |
| Water | 80.5 |

The percent by weight ranges of the Silwet L-77, Surfynol CT-111, 2-Pyrrolidone, 1,6 Hexanediol, LEG-1, Self-dispersed black pigment, acrylate binder and Proxel GXL all remain the same as described in the section on Ink A. Ink F also contains the surfactant Oleyl triethoxy mono diphosphate. Preferably, the percent by weight range of the Oleyl triethoxy mono diphosphate ranges from 0.05% to 3%.

TABLE 7

Ink G

| COMPOUND | PERCENT BY WEIGHT |
| --- | --- |
| Silwet L-77 | 0.3 |
| Surfynol CT-111 | 0.5 |
| 2-Pyrrolidone | 6 |
| 1,6 Hexanediol | 3 |
| LEG-1 | 1.5 |
| Self-dispersed black pigment | 3 |
| acrylate binder (Joncryl 67) | 3 |
| Tergitol 15s5 | 0.2 |
| Proxel GXL | 0.2 |
| Water | 82.1 |

Ink G represents another ink composition to which no decel-alleviating solvent has been added.

TABLE 8

Ink H

| COMPOUND | PERCENT BY WEIGHT |
|---|---|
| Silwet L-77 | 0.5 |
| Poly(oxy-1,2-ethandiyl), alpha-undecyl-omega-hydroxy-,(9CI) | 0.5 |
| 2-Pyrrolidone | 6 |
| 1,6 Hexanediol | 3 |
| LEG-1 | 1.5 |
| Self-dispersed black pigment | 3 |
| acrylate binder (Joncryl 67) | 3 |
| Proxel GXL | 0.2 |
| Water | 82.3 |

Ink H includes the use of the surfactant Poly(oxy-1,2-ethandiyl), alpha-undecyl-omega-hydroxy-,(9CI). Its percentage by weight can range from 0.05% to 3%. The other components of the ink have similar range to ink G.

Table 9 illustrates a comparison of Inks A through E in terms of the decel fix and waterfastness. Table 9 further illustrates the benefits gained by adding a decel-alleviating component to the ink composition of Ink A, which lacks a decel-alleviating solvent.

TABLE 9

Comparing decel fixes in terms of decel and wet smudge

| Examples | Decel Fix | % Decel | % decrease in the width of 1 mm line after wet smudge |
|---|---|---|---|
| A | none | 33 | 20 |
| B | Dowanol EPh | 3 | 40 |
| C | Dowanol PPh | 4 | 60 |
| D | Caprolactone | 10 | 30 |
| E | DMSO | 5 | 20 |

As stated above, the decel is quantified as a percent decease in drop velocity after the pen fires a few thousand drops. Greater than 10% decel is considered unacceptable. The wet smudge is characterized as a percent decrease in the line width of a 1 mm line which was rubbed with a two pound weight using a wet rubber. Specifically, a spring loaded eraser was run across a printed line to determine the wet smudge. When the meniscus hits the line it literally wipes away the ink, resulting in a washing effect, and not an abrasive effect.

Table 10 illustrates the effects of the surfactant Oleyl triethoxy mono diphosphate on the decel and waterfastness of the ink as compared to standard ink A. Table 10 illustrates a superior decel-alleviating effect.

TABLE 10

The effect of decel fixes on decel and wet smudge

| Examples | Decel Fix | % Decel | % decrease in the width of 1 mm line after wet smudge |
|---|---|---|---|
| A | none | 33 | 20 |
| F | Oleyl triethoxy mono diphosphate | 0 | 100 |

Table 11 illustrates the effect of another surfactant, Poly (oxy-1,2-ethandiyl), alpha-undecyl-omega-hydroxy-,(9CI). Compared to Ink G, the Poly(oxy-1,2-ethandiyl), alpha-undecyl-omega-hydroxy-,(9CI) (Ink H) demonstrates a superior decel-alleviating ability.

TABLE 11

The effect of decel fixes on decel and wet smudge

| Examples | Decel Fix | % Decel | % decrease in the width of mm line after wet smudge |
|---|---|---|---|
| G | none | 15 | 20 |
| H | Poly(oxy-1,2-ethandiyl), alpha-undecyl-omega-hydroxy-,(9CI) | 0 | 100 |

Both Oleyl triethoxy mono diphosphate and Poly(oxy-1,2-ethandiyl), alpha-undecyl-omega-hydroxy-,(9CI) are long alkyl chain surfactants. As illustrated in Tables 10 and 11, the surfactants reduce decel.

It will be readily apparent to those skilled in the art that various changes and modifications of an obvious nature may be made without departing from the spirit of the invention. All such changes and modifications are considered to fall within the scope of the invention as defined by the appended claims.

What is claimed is:

1. A inkjet ink composition having improved deceleration comprising a vehicle, a colorant, a block copolymer dispersant, and a deceleration-alleviating component selected from the group consisting of ethylene glycol phenyl ether, dimethyl sulfoxide, caprolactone and combinations thereof, wherein the deceleration-alleviating component is formulated to undergo rapid thermal decomposition upon heating and wherein the concentration of said deceleration-alleviating solvent in said ink composition being between 0.05% and 3%.

2. The ink composition of claim 1 further comprising a surfactant as the deceleration-alleviating component, the surfactant selected from the group consisting of Oleyl triethoxy mono disphosphate, Poly(oxy-1,2-ethandiyl), alpha-undecyl-omega-hydroxy-,(9CI) and combinations thereof.

3. A method for alleviating deceleration in an inkjet ink, the method comprising: providing an inkjet ink having block copolymer dispersant; and adding a deceleration-alleviating solvent to said inkjet ink, wherein the deceleration-alleviating solvent is formulated to undergo rapid thermal decomposition upon heating and is selected from the group consisting of ehtylene glycol phenyl ether, dimethyl sulfoxide, caprolactone, and combinations thereof, the concentration of said deceleration-alleviating solvent in said ink being between 0.05% and 3.0%.

4. The method according to claim 3 further comprising a surfactant as the deceleration-alleviating solvent selected from the group consisting of Oleyl triethoxy mono disphosphate, Poly(oxy-1,2-ethandiyl), alpha-undecyl-omega-hydroxy-,(9CI) and a combination thereof.

* * * * *

UNITED STATES PATENT AND TRADEMARK OFFICE
CERTIFICATE OF CORRECTION

PATENT NO. : 6,726,757 B2
DATED : April 27, 2004
INVENTOR(S) : Sarkisian et al.

It is certified that error appears in the above-identified patent and that said Letters Patent is hereby corrected as shown below:

Column 8,
Lines 43 and 59, delete "disphosphate," and insert therefor -- diphosphate, --.
Line 57, delete "solvent" and insert therefor -- solvent, the deceleration-alleviating solvent --.

Signed and Sealed this

Twentieth Day of July, 2004

JON W. DUDAS
*Acting Director of the United States Patent and Trademark Office*